United States Patent [19]
Lukasczyk et al.

[11] Patent Number: 5,911,407
[45] Date of Patent: Jun. 15, 1999

[54] METAL VALVE HOUSING

[75] Inventors: Wolfgang Lukasczyk, Lohr/Main; Karl Rüb, Gemünden/Main, both of Germany

[73] Assignee: Mannesmann Rexroth AG, Lohr/Main, Germany

[21] Appl. No.: 08/875,332
[22] PCT Filed: Nov. 24, 1995
[86] PCT No.: PCT/EP95/04633
§ 371 Date: Jul. 2, 1997
§ 102(e) Date: Jul. 2, 1997
[87] PCT Pub. No.: WO96/21818
PCT Pub. Date: Jul. 18, 1996

[30] Foreign Application Priority Data

Jan. 11, 1995 [DE] Germany .......................... 195 00 605

[51] Int. Cl.⁶ ................................................. F16K 31/00
[52] U.S. Cl. ........................ 251/359; 251/360; 251/366
[58] Field of Search ................................. 251/359, 360, 251/366, 367

[56] References Cited

U.S. PATENT DOCUMENTS

| | | | |
|---|---|---|---|
| 2,739,613 | 3/1956 | Kulikoff | .................................. 251/359 |
| 5,078,179 | 1/1992 | Amrhein . | |

FOREIGN PATENT DOCUMENTS

| | | |
|---|---|---|
| 85911 | 10/1921 | Austria . |
| 0621423 | 10/1994 | European Pat. Off. . |
| 833151 | 7/1954 | France .................................. 251/359 |
| 2225669 | 11/1974 | France . |
| 2594518 | 8/1987 | France . |
| 2596487 | 10/1987 | France . |
| 728783 | 11/1942 | Germany . |
| 826223 | 11/1951 | Germany . |
| 1247064 | 8/1967 | Germany . |
| 1425123 | 2/1969 | Germany . |
| 1295944 | 5/1969 | Germany . |
| 1916347 | 10/1969 | Germany . |
| 1954799 | 5/1971 | Germany . |
| 2131526 | 12/1972 | Germany . |
| 2161386 | 6/1973 | Germany . |
| 2631993 | 1/1978 | Germany . |
| 2648729 | 5/1978 | Germany . |
| 2658491 | 6/1978 | Germany . |
| 9407083 | 7/1994 | Germany . |

*Primary Examiner*—A. Michael Chambers
*Attorney, Agent, or Firm*—Martin A. Farber

[57] ABSTRACT

In the case of cast housing bodies with highly stressed regions of the housing, and in particular in the case of housings for valves with control pistons, the regions of the housings subjected to high stresses are developed as independent parts from a material which withstands the stressing and forms a cast unit together with the housing body.

26 Claims, 4 Drawing Sheets

METAL VALVE HOUSING

FIELD AND BACKGROUND OF THE INVENTION

The present invention relates to a metal valve housing having highly stressed regions.

In the case of valves, which are intended for corrosive fluids, it is known to line the housing with a material which is resistant to the fluid (Federal Republic of Germany 26 48 729 A1). In this known valve the housing serves merely to support the lining.

In a directional control valve in accordance with DE 21 61 386 C2, the valve housing consists of plastic which encloses the metal parts intended for the valve function, such as a guide bushing with control edges for the control piston and feed and discharge lines, and receives the fastening plate. Furthermore, from DE 12 95 944 a valve tappet is known which is developed as a composite body of cast iron and steel. The cast-iron section is cast onto the steel section by suitable measures.

SUMMARY OF THE INVENTION

The object of the present invention is to provide a valve housing having highly stressed regions, such as, for instance, the control edges of directional control valves, which housing can be produced by known sand-casting methods and assures a long life of the regions of the housing subject to high stresses. According to the invention the housing webs are formed of independent metal rings which are made of a material which is substantially resistant to stressing and have been bound to the housing body upon casting of the housing body. Due to the fact that only the highly stressed regions of the housing consist of a material, such as steel which can withstand these stresses, and thus can be easily attached as independent parts to the casting core and introduced together with it into the mold, the body of the housing can be cast in known manner, in which connection the independent parts attached to the core are connected and welded together with the housing body in form-locked or material-locked manner.

BRIEF DESCRIPTION OF THE DRAWINGS

With the above and other objects and advantages in view, the present invention will become more clearly understood in connection with the detailed description of preferred embodiments, when considered with the accompanying drawings of which.

DETAILED DESCRIPTION OF THE PREFERRED EMBODIMENTS

Figure 1:
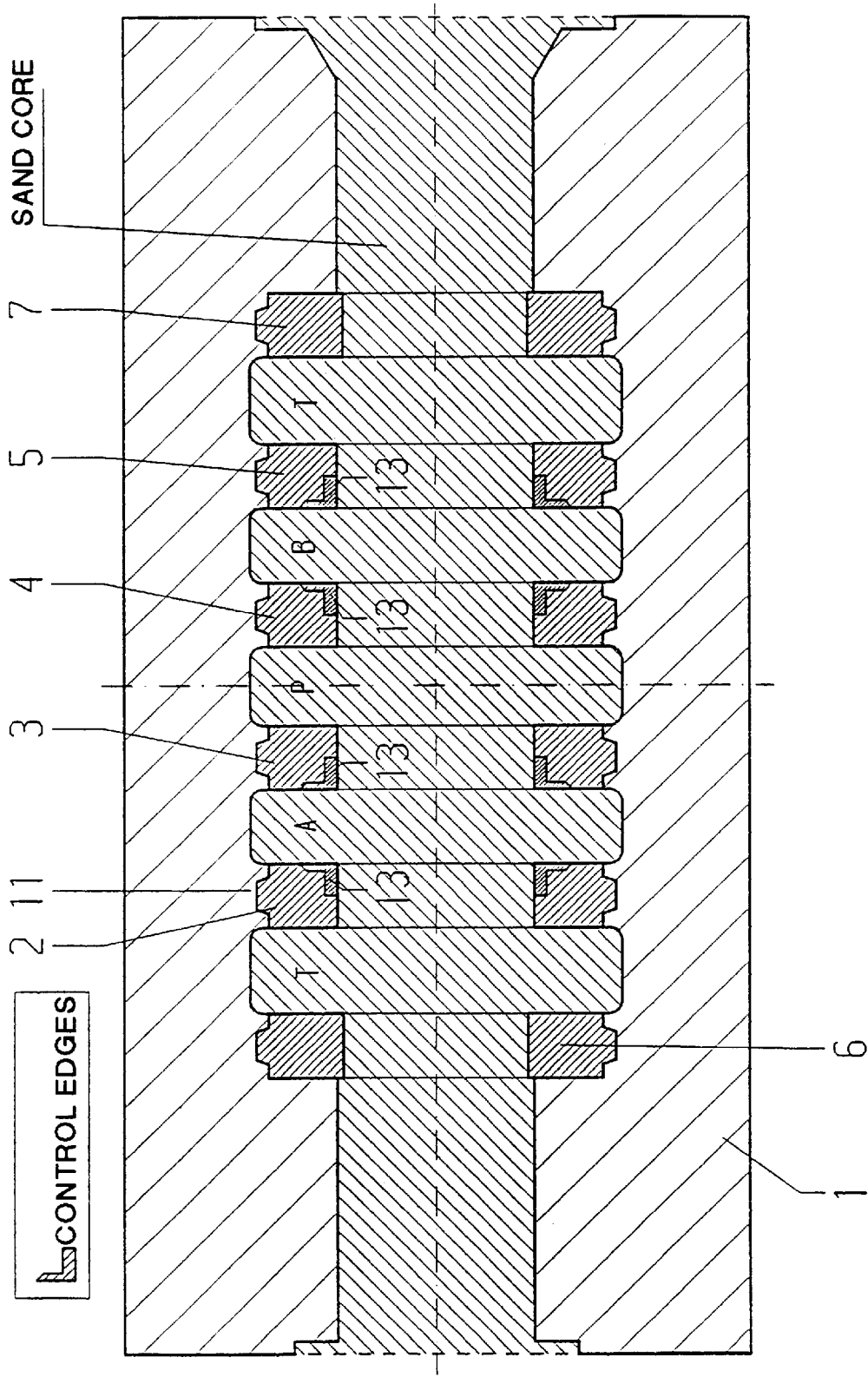
FIG. 1 is an axial section through a cast directional control valve housing with sand core.

In FIG. 1, 1 is the housing body cast of cast iron of a directional control valve which has a circumferential pump control space P, working control spaces A, B in communication with loads (not shown) and outside tank control spaces T. The control spaces are separated from each other by webs 2, 3, 4, 5 formed of steel rings, and the outside tank control spaces T are limited towards the outside by steel rings 6 and 7. The steel rings are surrounded by the sand core 10 on three sides and are introduced into the housing casting mold together with the sand core. Upon the pouring of the liquid cast iron, the free outer circumferential surface 11 of the steel rings is bound to the housing by fusion. After removal of the sand core 10, the inner, more densely hatched region 13 of the steel rings is finish-machined. The regions 13 serve for the guidance of the control piston (not shown) and as control edges which cooperate with corresponding control edges of the control piston (not shown) in the manner that adjacent control spaces A-T, P-B and P-A, B-T respectively are connected to each other in the one or other direction of flow of the fluid. During the finish-machining of the steel rings, there is no danger of the rings breaking off in the region of the control edges, as is the case with traditional housings in which the webs also consist of cast iron. The oversize of the steel rings for their finish machining can be kept smaller than in the case of cast iron in view of the greater strength and dimensional accuracy. There are thus obtained larger control spaces and correspondingly smaller flow losses. Furthermore, the control edges and guide surfaces of the steel rings for the control piston can be subsequently hardened, should this be necessary. Since the casting material is without importance for the control function, it may be of poorer quality.

Figure 2:
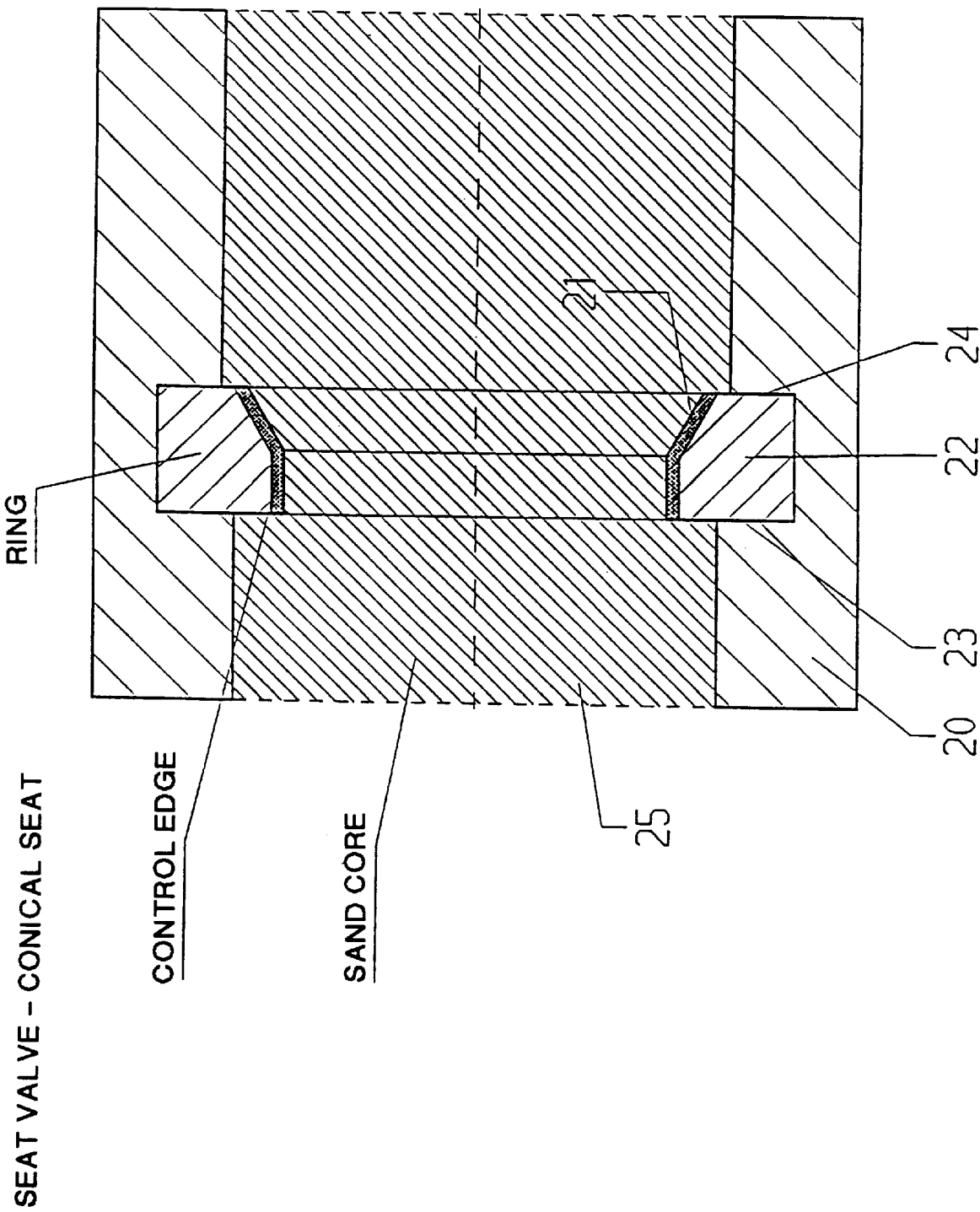
FIG. 2 is an axial section through a part of a cast seat-valve housing with sand core.

In the section of a seat valve housing 20 shown in FIG. 2, the valve seat 21 is formed by a steel ring 22, the sections 23, 24 of the end surface of which are cast in the housing 20 and thus fused to the housing. The remaining region of the steel ring 22 is embedded in the sand core 25. After removal of the sand core, the valve seat is finish-machined.

Figure 3:
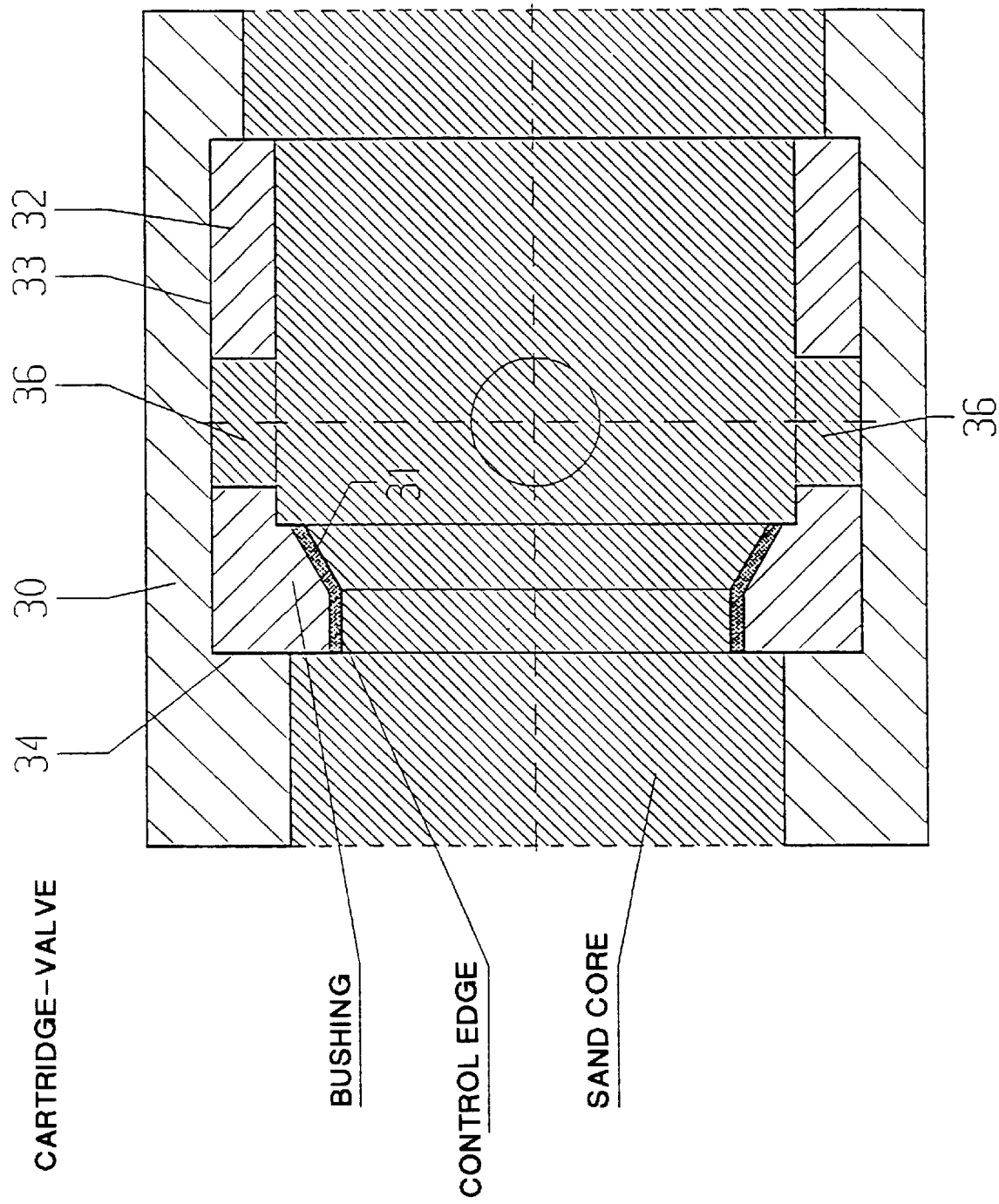
FIG. 3 is an axial section through a part of a cast seat-valve housing with sand core in which the control edge is formed by a bushing.

In FIG. 3, the valve seat 31 is formed by a sleeve 32 the outside circumferential surface 33 of which as well as the surface of the end section 34 of which is also fused to the valve-housing section 30. The sleeve already has prefabricated exit holes 36 so that radial holes need merely still be provided as outlet openings at the same places in the cast housing.

Figure 4:
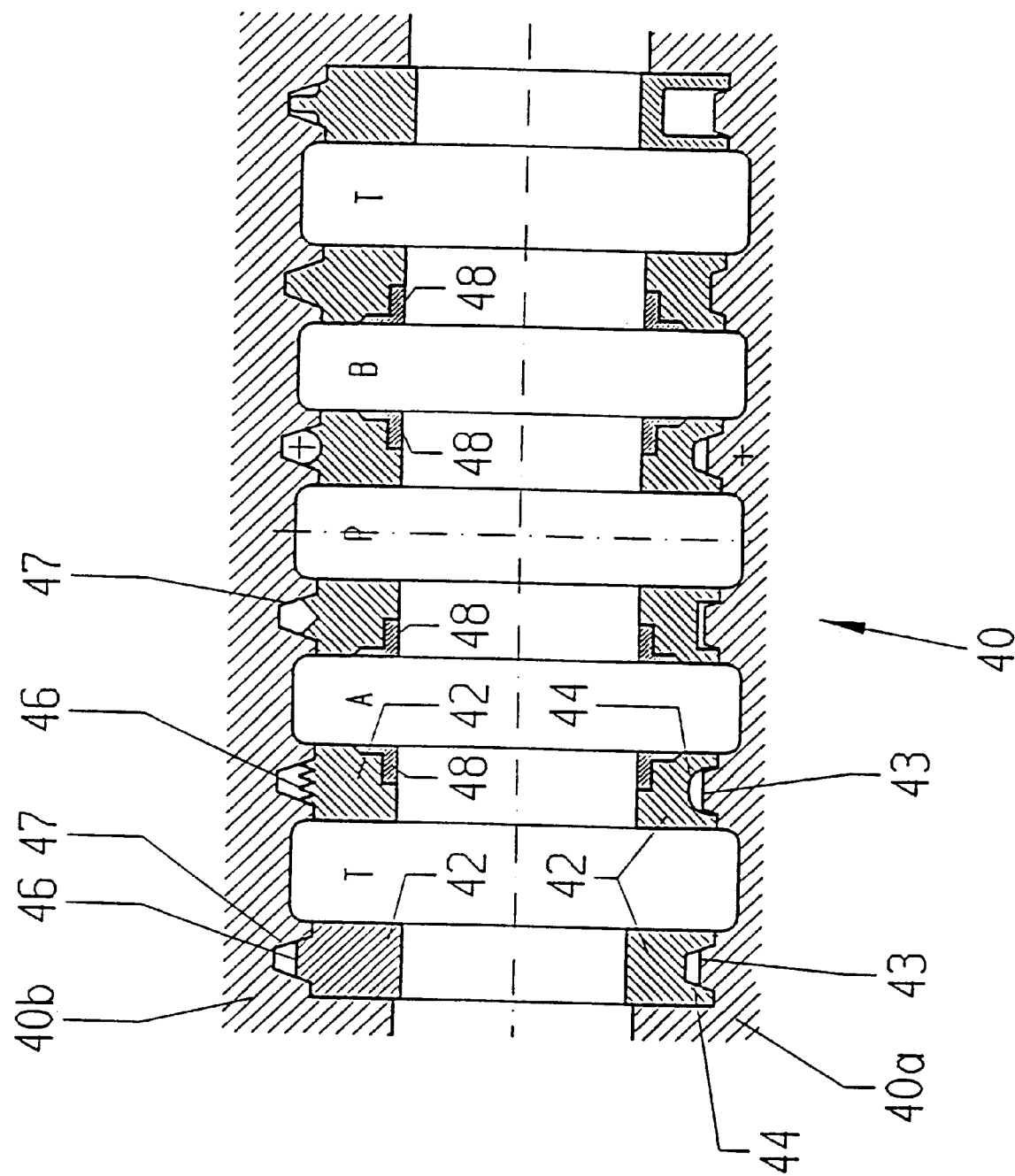
FIG. 4 is an axial section through a core mold.

The core mold 40 shown in FIG. 4 has in its lower half 40a circumferential trapezoidal projections 43 engaging in circumferential grooves 44 of the steel rings for receiving the steel rings 42 and at the same time fixing them in place. The grooves can have different profiles, as shown in the figure. These profiles become filled with liquid iron during the casting so that the rings are firmly and tightly anchored in the housing body after the solidification of the cast iron in the housing body. This is true also in the case of circumferential projections 46 on the outer periphery of the rings possible as alternative to grooves, corresponding to the upper half 40b of the core mold. In this case, the core mold has circumferential grooves 47 to receive the projections of the rings. The same groove profile or projection profile in the core mold may receive different profile developments of the projections or grooves on the circumference of the ring.

Due to the profiled development of the outer circumference of the rings and the corresponding development of the receiving profiles of the core mold, the rings are seated non-displaceably firm in the core mold during the shooting of the core. The densely hatched regions 48 of the rings form the control edges which cooperate with corresponding control edges on the control piston (not shown) and form the places in the housing which are subjected to particularly high stresses. In the case of larger housings, it may be advantageous from a manufacturing standpoint to connect only this angular region as independent parts at the corresponding place to the core, and to develop the rest of the web in traditional manner as part of the core mold of sand. It may also be advisable to develop the ring as a thin-walled U-shaped sheet-metal profile corresponding to the ring 42a in FIG. 4.

We claim:

1. A valve housing for a hydraulic valve comprising:
    a housing body and a plurality of webs extending from said housing inwardly towards a central region of said housing, said housing comprising a first material and said webs comprising a second material different from said first material, said second material being machinable for improved dimensional accuracy, said webs being spaced apart to define a set of chambers having at least one chamber, inner ends of said webs defining a passage for receiving a piston, said webs being provided with control edges cooperating with said piston, said piston being a displaceable control piston;
    wherein the said housing webs are formed of independent rings, said second material being substantially resistant to stressing, said rings being bound to said housing body; and
    in each of said chambers, a surface of one of said rings forms a sidewall of the chamber.

2. A valve housing according to claim 1, wherein said rings are metal rings and are attachable in material-locked manner by fusion upon a casting of the housing at points of contact with the housing body.

3. A valve housing according to claim 1, wherein an arrangement of said metal rings in said body enables a fixing of said rings to said body in a core mold.

4. A valve housing according to claim 1, wherein one of said webs comprises a metal ring having a recess or a projection on its outer periphery.

5. A valve housing according to claim 4, wherein a recess is formed by at least one circumferential groove on the outer circumference of a metal ring.

6. A valve housing according to claim 4, further comprising at least one circumferential web, wherein a projection is formed by said at least one circumferential web on the outer periphery of at least one of said metal rings.

7. A valve housing according to claim 4, wherein a configuration of said body and said webs permits fabrication of the valve housing by a core mold and, for receiving and holding in place a metal ring, said core mold has a recess which receives a projection of the metal ring or a projection which extends into a recess in said metal ring.

8. A valve housing according to claim 7, wherein a recess or a projection of the core mold has a trapezoidal cross section.

9. A valve housing according to claim 8, wherein said metal rings are attached in a fused material-locked manner at points of contact with said housing body.

10. A valve housing according to claim 8, wherein a configuration of said body and said metal rings permits fabrication of the valve housing in a core mold.

11. A valve housing according to claim 8, wherein one of said metal rings has a recess or a projection on its outer periphery.

12. A valve housing according to claim 11, wherein said recess is formed by at least one circumferential groove on the outer circumference of said metal ring.

13. A valve housing according to claim 11, wherein said projection is formed by at least one circumferential web on the outer periphery of said metal ring.

14. A valve housing according to claim 11, wherein for receiving and holding in place a metal ring said core mold has a recess which receives a projection of the metal ring or a projection which extends into a recess in said metal ring.

15. A valve housing according to claim 14, wherein a recess or a projection of the core mold has a trapezoidal cross section.

16. A metal valve housing for a hydraulic valve, the housing having a cast housing body with a plurality of housing webs, said webs being enclosed by said housing body and having control edges for operation with a displaceable control piston located in a passage defined by said housing webs, wherein said webs are spaced apart to define chambers of a valve, and the control-edges of said webs are formed of independent metal rings which are made of a material which substantially withstands stressing to a greater extent than a material of said body, and permit fabrication of the housing by casting wherein the rings are components of the casting core being bonded to the housing body upon a casting of the housing body; and
    in each of said chambers, a surface of one of said rings forms a sidewall of the chamber.

17. A valve housing of metal for a hydraulic valve having a cast housing body, in which a control bore is present to receive a control piston which is axially displaceable in the control bore, said housing having a plurality of control chambers which are spaced axially from each other and annularly surround the control bore, said housing comprising housing webs which separate said chambers from each other and provide for a formation of guide edges, the guide edges being finish-machined on their entire respective inner sides facing the control bore and in a guide-edge range of limited radial depth on at least one of their axial end sides;
    wherein each of said housing webs is formed, at least in a region of its final machining, of an independent metal ring which consists of a substantially stress-resistant material bonded to the housing body as component of a cast mold upon a casting of the housing body, the metal rings having on both of their respective sides, adjoining respective regions of final machining, an end surface which axially limits respective ones of said control chambers and is free of cast material.

18. A housing according to claim 17, wherein end surfaces of respective ones of said metal rings are free of cast material up to an edge between an inner surface and an outer circumference of each of said metal rings, and said metal rings are held axially at their outer circumference on said housing body.

19. A valve housing according to claim 18, wherein said metal rings are connected in form-locked manner with said housing body by fusion at casting contact places.

20. A valve housing according to claim 18, wherein said control chambers extend radially deeper than the edges between the free end surfaces and the outer circumferences of the respective adjoining metal rings, and that one of the control chambers outside the edge have the same axial width as in the region of said metal rings.

21. A valve housing according to claim 18, wherein an individual one of said metal rings has a recess or a projection on an outer circumference of the ring.

22. A valve housing according to claim 21, wherein at least one of said metal rings has a circumferential groove on the outer circumference of the ring.

23. A valve housing according to claim 21, wherein at least one of said metal rings has a projection extending around the outer circumference of the ring.

24. A core mold for the production of a valve housing according to claim 21, wherein, for the receiving and fixing of an individual one of said metal rings, the mold has a recess receiving the projection on the outer circumference of the metal ring or a projection extending into a groove on the outer circumference of the metal ring.

25. A core mold according to claim 24, wherein a mold recess or mold projection is of trapezoidal cross section.

26. A valve housing according to claim 17, wherein, seen axially, two outer control chambers and at least one inner control chamber are present, and that the outer control chambers seen also on the outer side viewed from the inner control chambers are axially limited by further ones of said metal rings cast in place.

* * * * *